Feb. 24, 1942.   J. H. BLANKENBUEHLER   2,274,356
POLARITY CONTROL SYSTEM
Filed March 4, 1939
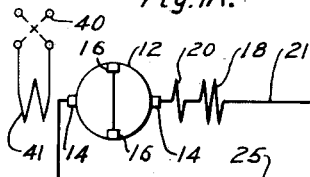
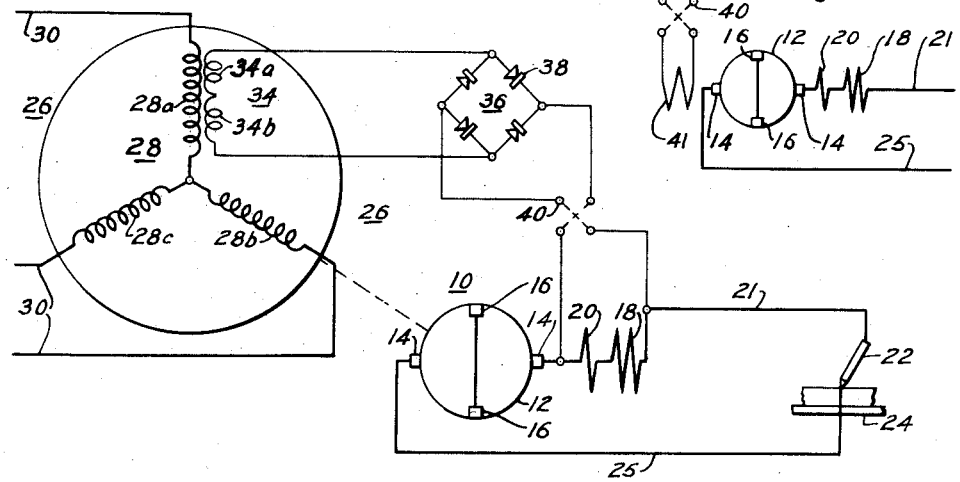
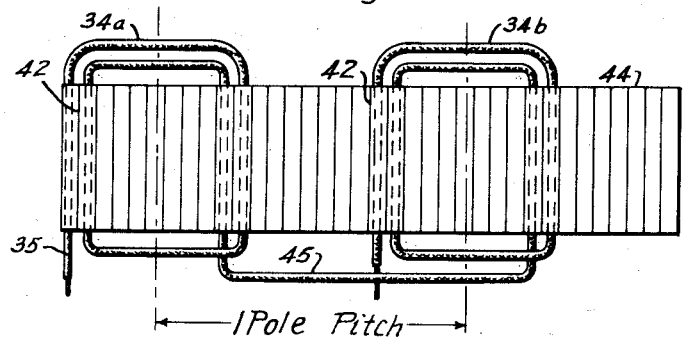
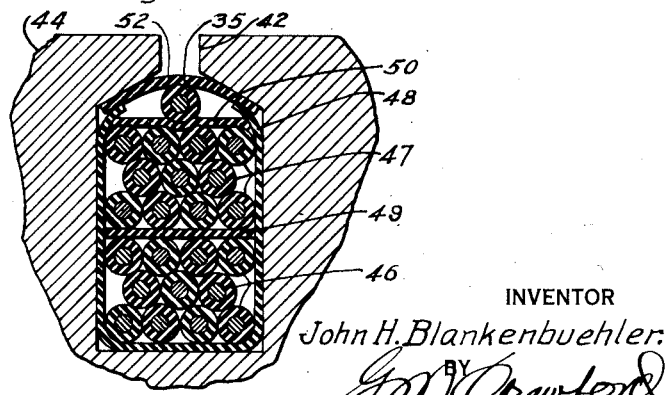
WITNESSES:
N. F. Susser
G. V. Giolma
INVENTOR
John H. Blankenbuehler
BY
G. W. Crawford
ATTORNEY Patented Feb. 24, 1942

2,274,356

UNITED STATES PATENT OFFICE 2,274,356

POLARITY CONTROL SYSTEM

John H. Blankenbuehler, Edgewood, Pa., assignor to Westinghouse Electric & Manufacturing Company, East Pittsburgh, Pa., a corporation of Pennsylvania Application March 4, 1939, Serial No. 259,782

2 Claims. (Cl. 171—225)

My invention relates generally to control systems, and it has reference, in particular, to a system of polarity control for welding generators of the cross-field type.

As the operating characteristics of a generator of the cross-field type are peculiarly suited to the requirements of arc welding, this type of generator is widely used for that purpose. In a preferred form, the cross-field generator is provided with field poles having field windings that are connected in series circuit relation with the load circuit for producing the flux in the body of the field poles, and an armature having main brushes connected in the load circuit and auxiliary brushes that are close-circuited to provide an armature path for a cross-field excitation current. The residual magnetism of the field poles induces a cross-field excitation current in the close-circuited auxiliary brush armature circuit and this current produces a cross-field flux in the faces of the field pole members. As the voltage across the main brushes of the cross-field generator is produced by the armature conductors cutting the cross-field flux produced in the faces of the field poles by the cross-field excitation current in the close-circuited auxiliary brush circuit of the armature it is apparent that the open-circuit voltage, being thus dependent on the residual flux of the field poles, will be relatively low, particularly in comparison with the open-circuit voltage of other types of generators which, have, for example, shunt field windings to provide a strong no-load field flux for generating the open circuit voltage of the generator.

Because of the relatively low open-circuit voltage of generators of the cross-field type, accidental reversal of the terminal polarity of generators of this type may not be uncommon when such generators are being used in conjunction with other types of generators having higher open-circuit voltages, since accidental contact of the welding electrodes of the generators results in the circulation of a current through the series field windings of the cross-field generator in a reverse direction to the normal flow of current in these field windings, thus reversing the polarity of the residual magnetism of the field poles. Since the terminal polarity of a welding generator is an important factor in securing satisfactory welds, it is important that the terminal polarity of the generator be maintained at the desired polarity. Hence, it is desirable to provide for ensuring the correct terminal polarity of welding generators of the cross-field type. Moreover, since the no-load terminal polarity of a generator of the cross-field type is dependent entirely upon the polarity of the residual magnetism of the field poles of the generator, it has been found that the terminal polarity of the generator may be readily controlled under no-load conditions by providing for selectively applying an auxiliary control potential to a winding on a field pole of the generator, instead of utilizing the relatively large and expensive switch structures heretofore utilized in changing connections in the load circuit of the generator. For example, the control potential may be applied to a separate polarity control field winding on a field pole of the generator, or it may, as in the present instance, be applied to a main winding of the generator.

An object of my invention, generally stated, is to provide in a simple and effective manner for controlling the terminal polarity of a generator of the cross-field type.

More specifically, it is an object of my invention to provide for controlling the terminal polarity of a generator of the cross-field type by coupling a polarity control circuit of the generator with at least a portion of the stator winding of an alternating current motor which may be utilized for driving the generator.

Another object of my invention is to provide for energizing a polarity control circuit of a generator of the cross-field type from an auxiliary winding of an associated alternating current motor.

A further object of my invention is to provide, in a simple and effective manner, for applying a polarity control potential to a field winding of a generator of the cross-field type by connecting the field winding to an auxiliary winding positioned in coupled relation with the primary winding of the alternating current driving motor of the generator.

Other objects will, in part, be obvious, and will, in part, be explained hereinafter.

In practicing a preferred embodiment of my invention, an auxiliary winding is positioned in the slots of the stator core of an alternating current motor so as to be inductively coupled with the main stator winding of the motor. The auxiliary winding is connected to a rectifying device, and the direct current terminals thereof are connected by means of a reversing switch to a field winding of the cross-field generator, which is driven by the motor, so as to provide a control potential for maintaining and controlling the terminal polarity of the generator.

For a further understanding of the nature and scope of my invention, reference may be had to the following detailed description, taken in connection with the accompanying drawing, in which—

Figure 1 illustrates diagrammatically a polarity control system constructed in accordance with a preferred embodiment of my invention.

Fig. 1A illustrates an application of the invention utilizing an auxiliary generator field winding.

Fig. 2 represents schematically a portion of a motor stator core in a preferred construction, showing the position of the auxiliary winding in the stator core of the motor, and Fig. 3 is a cross-section of a slot in the stator core of the motor illustrating the relative positions of the main stator winding and the auxiliary winding in accordance with a preferred embodiment of my invention.

Referring particularly to Fig. 1, the reference numeral 10 denotes, generally, a welding generator of the cross-field type having an armature 12 with main brushes 14 and close-circuited auxiliary brushes 16. Series field windings 18 and commutating windings 20 are preferably utilized as the main source of flux for the generator, and are, as shown, connected in series circuit relation with the main brushes 14, conductor 21, welding electrode 22 and work 24 upon which a welding operation is to be performed, and conductor 25.

The driving motor 26 of the generator 10 is preferably a polyphase induction motor provided with a main stator winding 28, comprising phase windings 28a, 28b and 28c which may, for example, be interconnected in star, as shown, and connected to a suitable source of alternating current by conductors 30.

In order to provide a polarity control potential for controlling the terminal polarity of the generator 10, an auxiliary winding 34 is provided, which is, for example, closely coupled with at least a portion of the stator winding 28 of the motor, so that a voltage will be induced in the auxiliary winding 34 by transformer action with the adjacent turns of the stator winding 28 of the motor. It will be understood that while the coils 34a and 34b of the auxiliary winding are illustrated as coupled with the phase winding 28a of the motor winding, there may also be flux linkages between the coils of the auxiliary winding 34 and the other phases of the motor winding. As the magnetic field of the polyphase motor winding is a rotating field, it is immaterial with which phase or phases of the motor winding the auxiliary winding is coupled, as the ultimate result is the same.

Rectifying means, such as the bridge circuit 36 of unidirectional current devices 38, is connected to the winding 34 for rectifying the alternating current voltage induced in the auxiliary winding, and a reversing switch 40 is utilized to selectively connect the direct current terminals of the rectifying means to the field windings 18 and 20 of the generator or to a separate polarity control field winding 41 in the manner shown in Fig. 1A of the drawing so as to provide for ensuring and controlling the polarity of the residual magnetism of the field poles of the generator 10, and hence the terminal polarity of the generator.

Inasmuch as the field windings 18 and 20 of the generator 10 are connected in series circuit relation with the main brushes 14 of the generator, it is apparent that they will normally be energized only when a load is applied to the generator. Under no-load conditions, the field windings 18 and 20 are normally deenergized, and the open-circuit voltage of the generator is normally entirely dependent upon the residual magnetic flux of the field poles, since the cross-field flux in the faces of field poles of the generator, which produces the voltage across the main brushes 14, is itself produced by the cross-field exciting current of the auxiliary brush armature circuit, which is, in turn, produced by armature conductors cutting the residual flux of the field poles. Accordingly, it will be understood that by merely applying a control potential across the field windings 18 and 20, or to the separate winding 41, and thus controlling the polarity of the residual magnetism of the field poles, the no-load terminal polarity of the main brush circuit may be readily controlled.

Referring to Figs. 2 and 3 of the drawing, it may be seen that the auxiliary winding 34 comprises, generally, coils 34a and 34b, which comprise a plurality of looped turns of insulated conductor 35 positioned in the slots 42 of the stator core 44, preferably, after the main stator winding 28 has been positioned therein in the usual manner. The turns of each coil may be placed in a single pair of slots or distributed, as illustrated. By providing a suitable number of turns in the coils of auxiliary winding 34 and positioning them in the slots of the stator core 44 so that they are coupled with the portions of the main stator winding 28 of the motor within the slots, in the manner shown, any suitable potential may be secured, depending on the number of turns and the pitch of the coils of the auxiliary winding, for application to the field windings of the generator for controlling the terminal polarity thereof.

For example, in the present instance, the stator winding 28 is a three phase, two-pole winding having two coil sides per slot. As the stator core has thirty-six slots, the poles thereof are eighteen slots apart. Since the magnetic field of the stator winding is polyphase, and hence rotates around the stator, the actual position of the auxiliary coils 34a and 34b relative to the stator winding 28 is immaterial. However, it is preferable that the two auxiliary coils 34a and 34b be located relative to each other so that they are one pole pitch apart, as then the voltages in the two coils will be 180° out of phase. By connecting the coils in series circuit relation in the opposite sense by a connector 45, the voltages of the two coils will be in phase and the resultant will be their sum.

Referring particularly to Fig. 3, which represents a cross-section of a stator slot, it may be seen that the two coil sides 46 and 47 of the main stator winding 28 are preferably first positioned in the slot with suitable insulation such as, for example, the channel shaped piece of fish paper 48 between the winding and the walls of the slot and a layer of insulation 49 between the coil sides. A layer of insulating material 50 is preferably placed on top of the main stator winding 28. The insulated conductor 35 of the auxiliary winding 34 is then positioned in the slot on top of the main winding, being insulated therefrom by the layer of insulating material 50. The sides of the fish paper 48 may then be folded down over the auxiliary winding to protect it from abrasion, and an insulating wedge 52 driven in the slot to close the slot and securely position the main stator winding and the auxiliary winding therein.

It is to be understood that coupling of the auxiliary winding with the stator winding of the motor may be effected in any of a number of ways for the purpose of my invention, and my invention is not intended to be limited to the particular manner hereinbefore shown and described.

From the above detailed description, taken in connection with the accompanying drawing, it will be understood that by providing an auxiliary motor winding in coupled relation with the main alternating current winding of the motor, rectifying the voltage induced in the auxiliary winding by transformer action with the main windings of the motor and applying the said voltage to the series field windings or to a separate polarity control winding of the cross-field welding generator driven by the motor through a reversing switch, in the manner hereinbefore shown and described, a simple and effective polarity control system is provided for the welding generator. Instead of requiring expensive and cumbersome load circuit switches, or external transformers, as used for controlling the terminal polarity of generators in accordance with the prior art, my invention provides for connection of a polarity control circuit of a cross-field generator directly to the auxiliary winding of the motor, thus providing a simple and inexpensive source of polarity control potential which is automatically energized and deenergized with the connection and disconnection of the driving motor of the generator to and from the source, and which is efficient and economical to operate.

Since certain changes may be made in the above description and different embodiments of the invention may be made without departing from the spirit thereof, it is intended that all the matter contained in the above description or shown in the accompanying drawing shall be considered as illustrative, and not in a limiting sense.

I claim as my invention:

1. The combination with a welding generator having a plurality of field windings and an armature rotatably associated therewith connected in driven relation to a motor having a stator with distributed phase windings positioned in slots therein of, a polarity control circuit for the welding generator comprising, a plurality of single conductor coil sections positioned in the slots on top of the main motor winding and insulated therefrom, rectifying means connected directly to the auxiliary winding, and a reversing switch connecting the rectifying means to one of the generator field windings so as to apply a control voltage to said winding to control the no-load terminal polarity of the generator.

2. The combination with a generator of the cross-field type having series field windings and an armature associated therewith driven by an alternating current motor with distributed phase stator windings positioned in slots in the stator thereof, of a rectifier of the dry plate type having direct current and alternating current terminals, a reversing switch connecting the direct current terminals of the rectifier across one of the series field windings, and an auxiliary polarity control winding having a plurality of single conductor distributed coil sections superimposed on the motor stator windings in the upper portion of the slots and positioned substantially a pole pitch apart connected directly to the alternating current terminals of the rectifier to apply a control voltage thereto of sufficient value to control the no-load terminal polarity of the generator.

JOHN H BLANKENBUEHLER.